United States Patent
Takenaga et al.

(10) Patent No.: US 8,285,094 B2
(45) Date of Patent: Oct. 9, 2012

(54) MULTICORE FIBER

(75) Inventors: Katsuhiro Takenaga, Sakura (JP); Ning Guan, Sakura (JP); Syouji Tanigawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/403,539

(22) Filed: Feb. 23, 2012

(65) Prior Publication Data

US 2012/0195563 A1    Aug. 2, 2012

Related U.S. Application Data

(63) Continuation of application No. PCT/JP2010/064280, filed on Aug. 24, 2010.

(30) Foreign Application Priority Data

Aug. 28, 2009    (JP) .................................. 2009-199094

(51) Int. Cl.
    *G02B 6/44*    (2006.01)
(52) U.S. Cl. ........ 385/100; 385/101; 385/102; 385/103; 385/104; 385/105; 385/106; 385/107; 385/108; 385/109; 385/110; 385/111; 385/112; 385/126; 385/127; 385/128
(58) Field of Classification Search ............ 385/10–112, 385/126–128
    See application file for complete search history.

(56) References Cited

U.S. PATENT DOCUMENTS

| | | | | |
|---|---|---|---|---|
| 4,478,488 A | * | 10/1984 | Bagley | 385/104 |
| 7,292,758 B2 | * | 11/2007 | Bayindir et al. | 385/101 |
| 7,295,734 B2 | * | 11/2007 | Bayindir et al. | 385/101 |
| 7,567,740 B2 | * | 7/2009 | Bayindir et al. | 385/101 |
| 2003/0140659 A1 | | 7/2003 | Fabian | |
| 2009/0097805 A1 | * | 4/2009 | Bayindir et al. | 385/101 |
| 2009/0169158 A1 | * | 7/2009 | Bayindir et al. | 385/101 |

FOREIGN PATENT DOCUMENTS

| | | |
|---|---|---|
| JP | 63-131109 A | 6/1988 |
| JP | 6-186443 A | 7/1994 |

(Continued)

OTHER PUBLICATIONS

Koshiba et al.; "Heterogeneous multi-core fibers: proposal and design principle"; IEICE Electronics Express, vol. 6, No. 2, Jan. 25, 2009, pp. 98-103.(cited in ISR).

(Continued)

*Primary Examiner* — Brian M. Healy
*Assistant Examiner* — Guy Anderson
(74) *Attorney, Agent, or Firm* — Westerman, Hattori, Daniels & Adrian, LLP

(57) ABSTRACT

The multicore fiber comprises 7 or more cores, wherein diameters of the adjacent cores differ from one another, wherein each of the cores performs single-mode propagation, wherein a relative refractive index difference of each of the cores is less than 1.4%, wherein a distance between the adjacent cores is less than 50 μm, wherein, in a case where a transmission wavelength of each of the cores is $\lambda$, the distance between the adjacent cores is $\Lambda$, a mode field diameter of each of the cores is MFD, and a theoretical cutoff wavelength of each of the cores is $\lambda c$, $(\Lambda/\text{MFD}) \cdot (2\lambda c/(\lambda c+\lambda)) \geq 3.95$ is satisfied, and wherein a distance between the outer circumference of the core and an outer circumference of the clad is 2.5 or higher times as long as the mode field diameter of each of the cores.

6 Claims, 10 Drawing Sheets

FOREIGN PATENT DOCUMENTS

JP           2004-501048 A       1/2004

OTHER PUBLICATIONS

Takenaga et al.; "Reduction of Crosstalk by Quasi-Homogeneous Solid Multi-Core Fiber", OFC/NFOEC, May 18, 2010, (cited in ISR).

International Search Report of PCT/JP2010/064280, mailing date of Sep. 21, 2010.

Advanced Electronics I-16 Hikari Fiber to Fiber-kei Device, Baifukan Co., Ltd., Jul. 10, 1996, pp. 31, 41 and 42. (cited in ISR).

Arakawa et al.; "Reduction of Crosstalk by Quasi-Homogeneous Solid Multi-Core Fiber"; The Institute of Electronics, Information and Communication Engineers 2010 Nen Sogo Taikai Koen Ronbunshu Tsushin Ronbunshu 2, Mar. 2, 2010, B-10-19, p. 357 (with translation).(cited in ISR).

* cited by examiner

[Fig. 1]
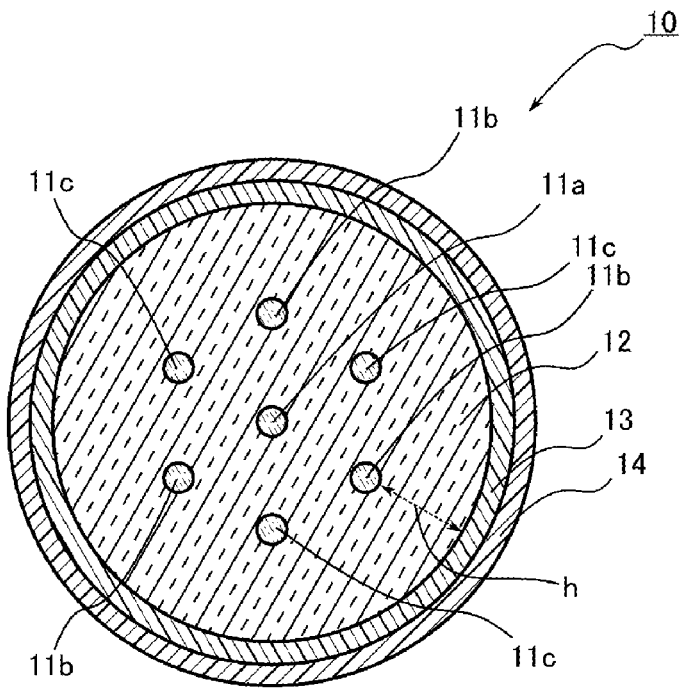
[Fig. 2]
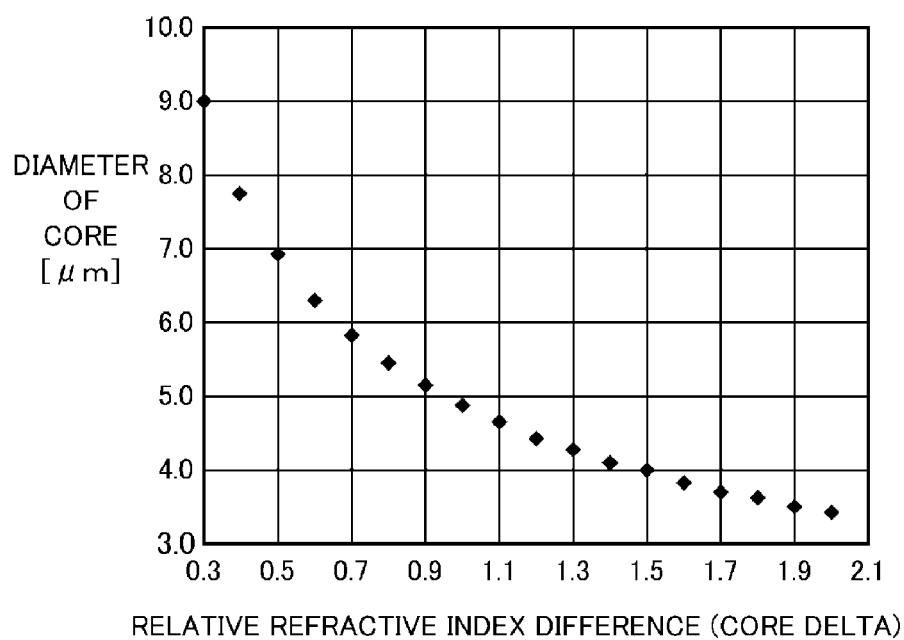

[Fig. 3]
(a)
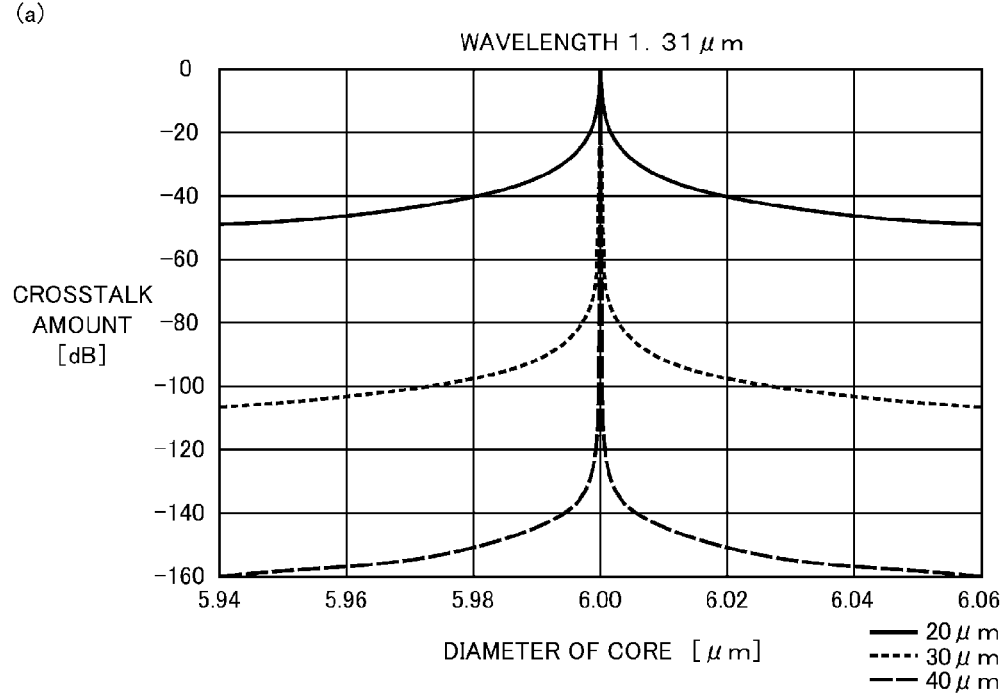
(b)
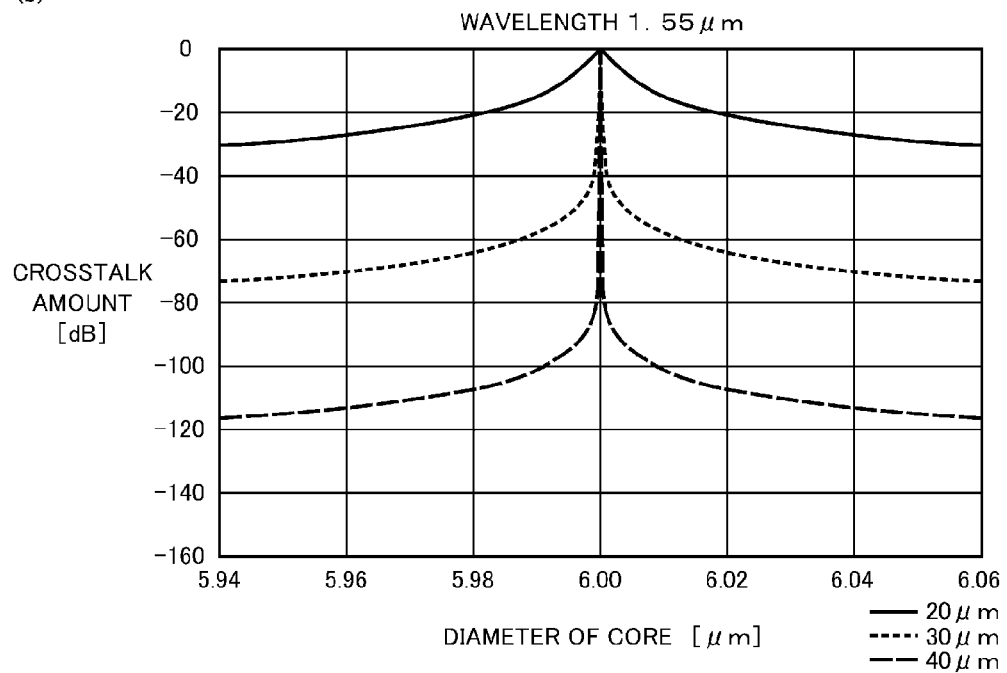

[Fig. 4]
(a)
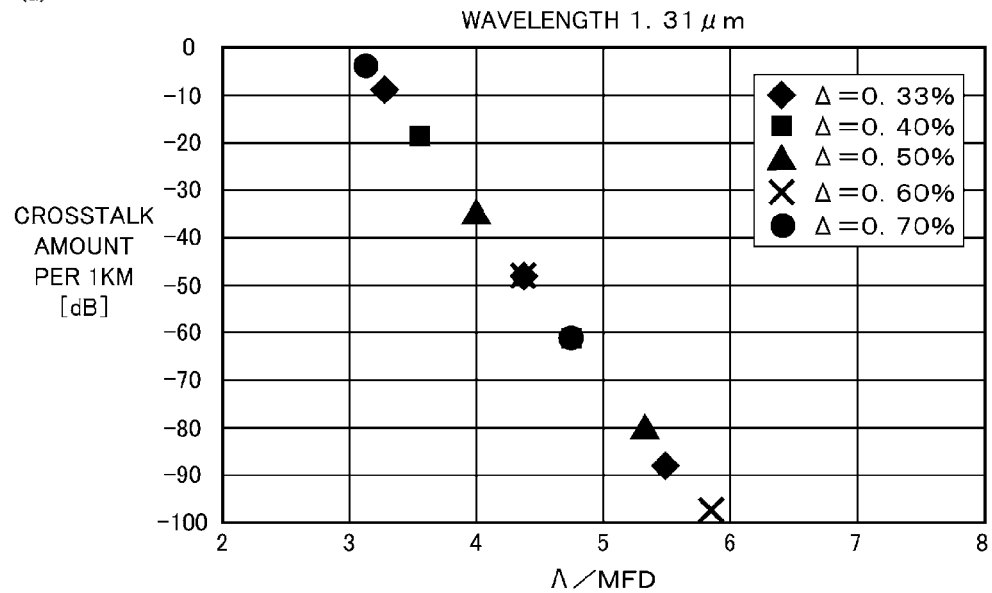
(b)
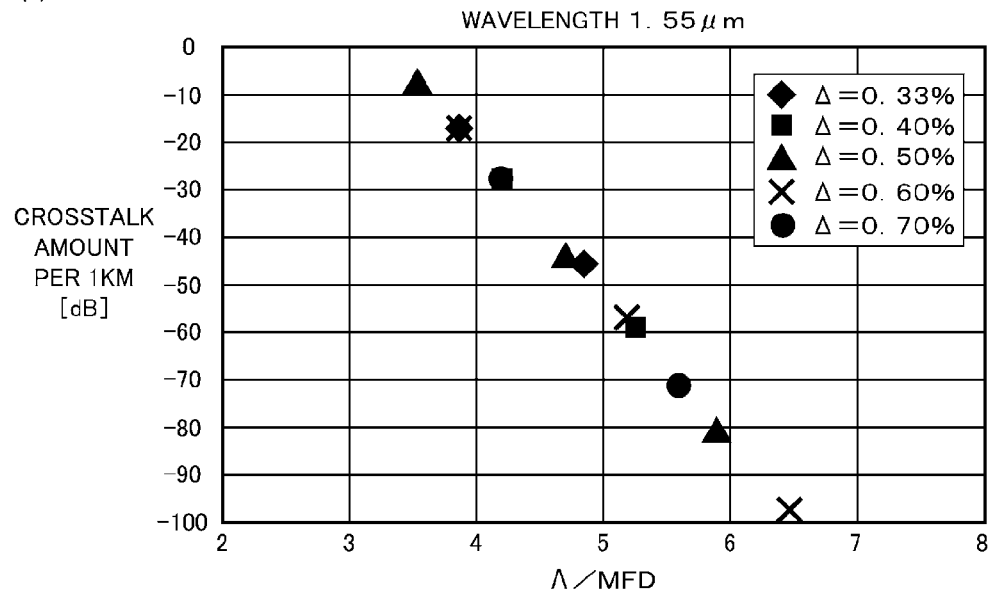

[Fig. 5]
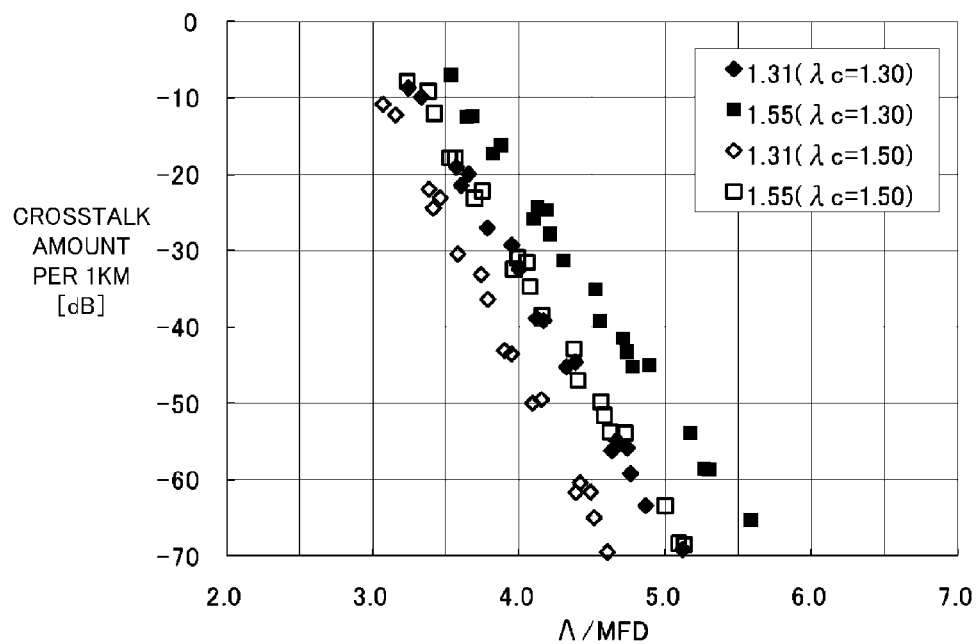
[Fig. 6]
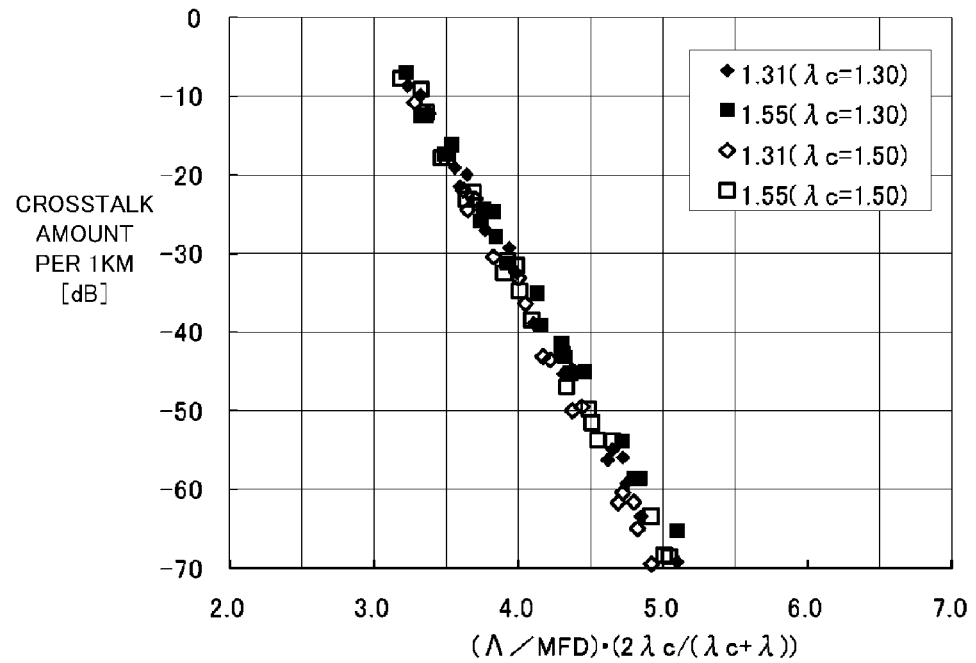

[Fig. 7]
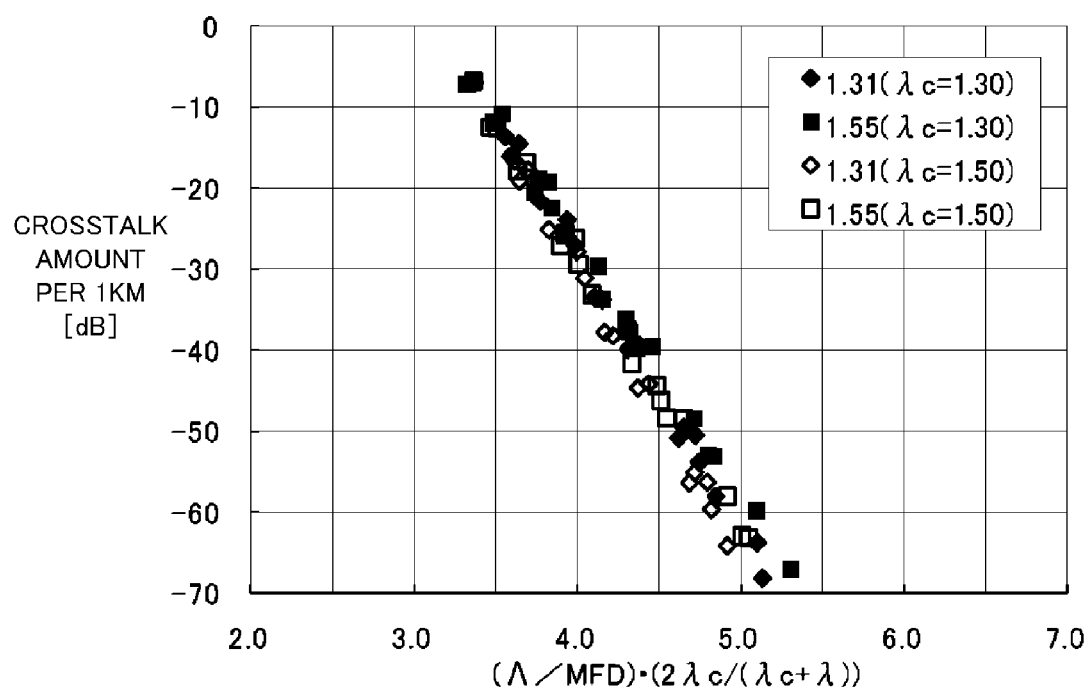

[Fig. 8]
(a)
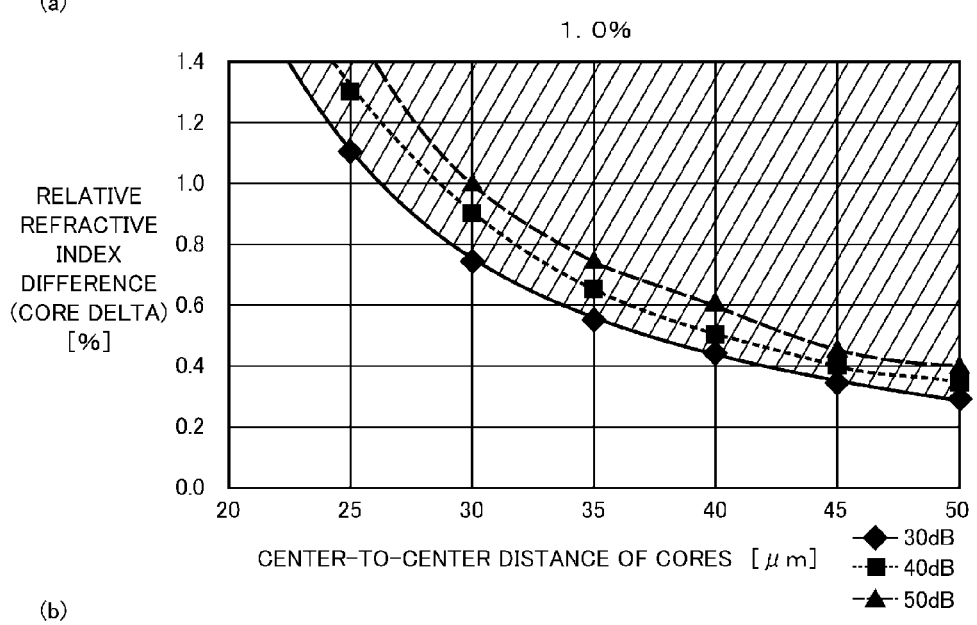
(b)
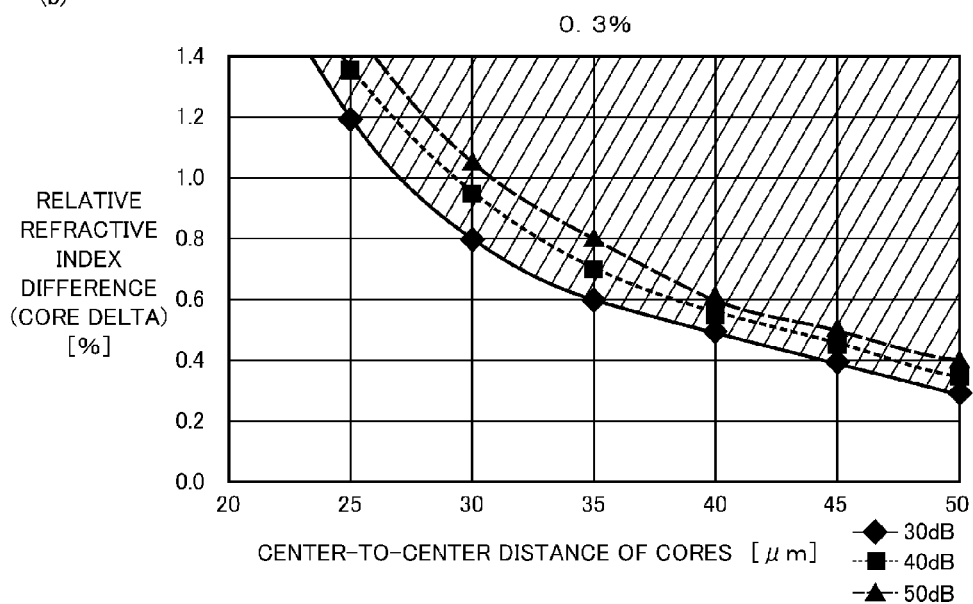

[Fig. 9]
(a)
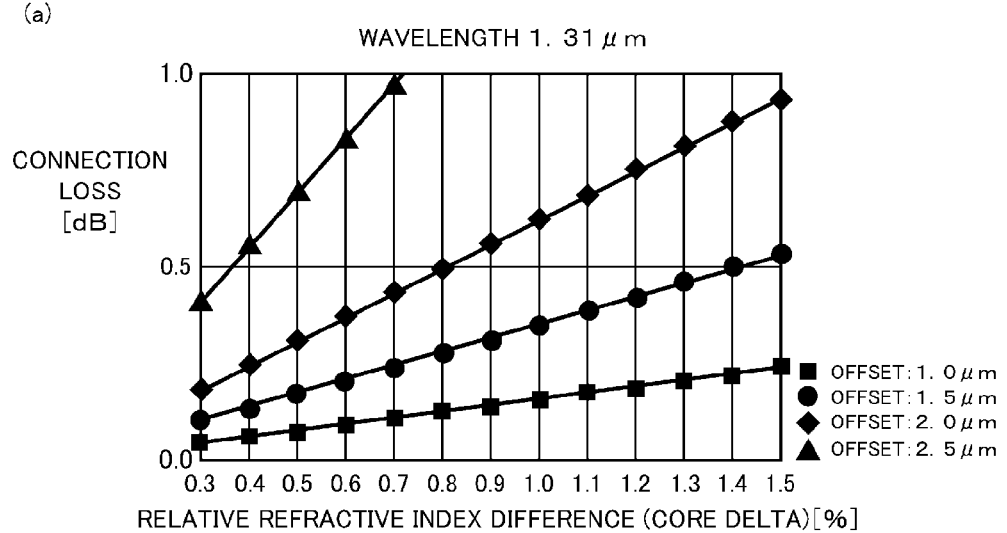
(b)
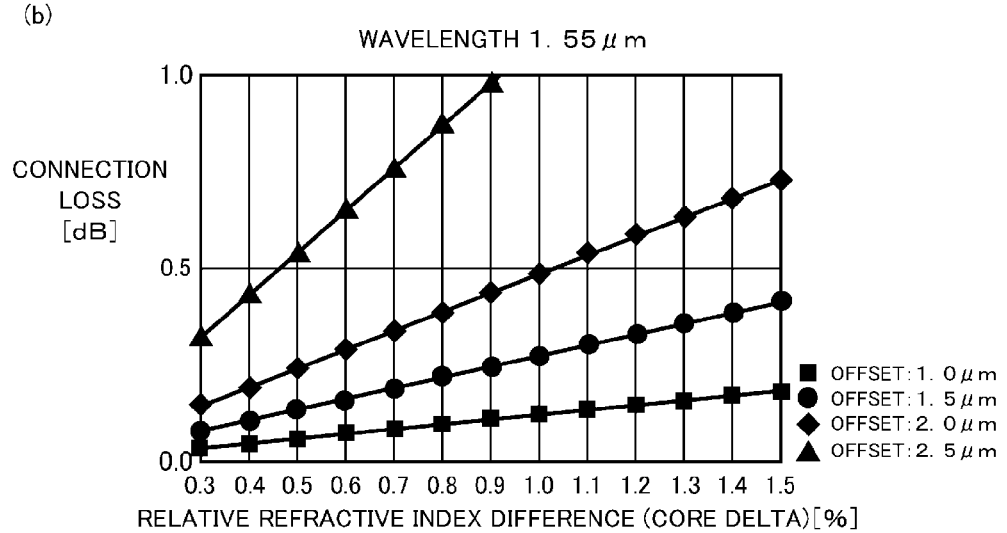

[Fig. 10]
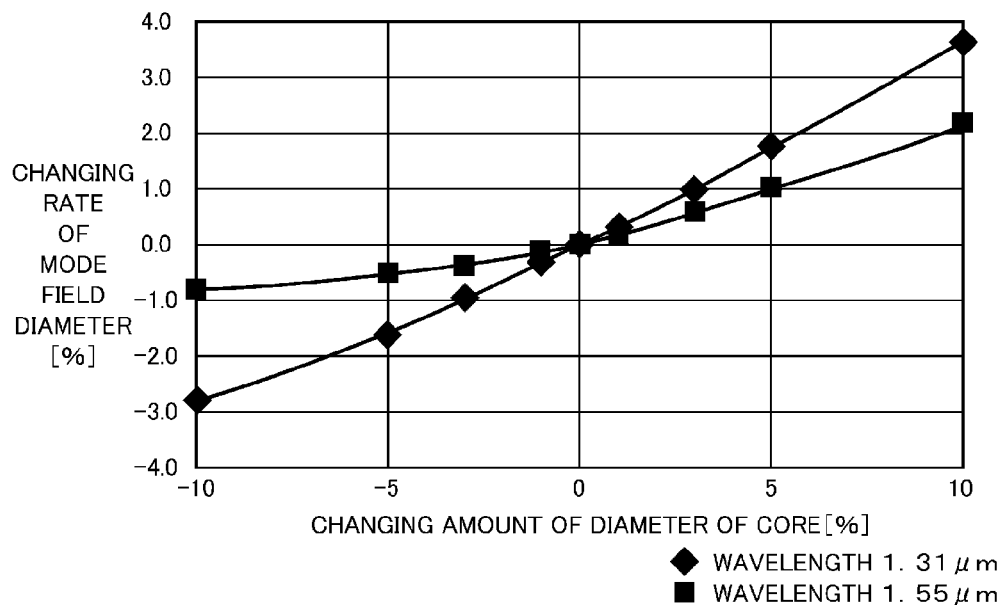
[Fig. 11]
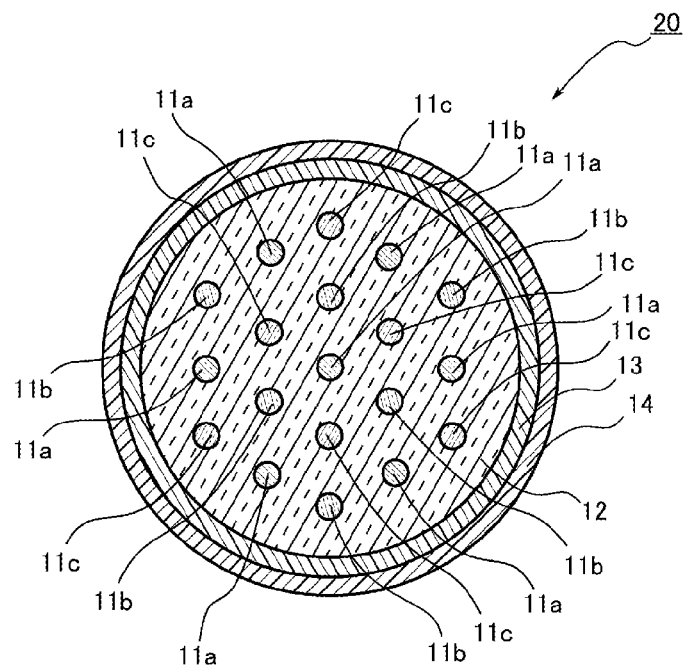

[Fig. 12]
(a)
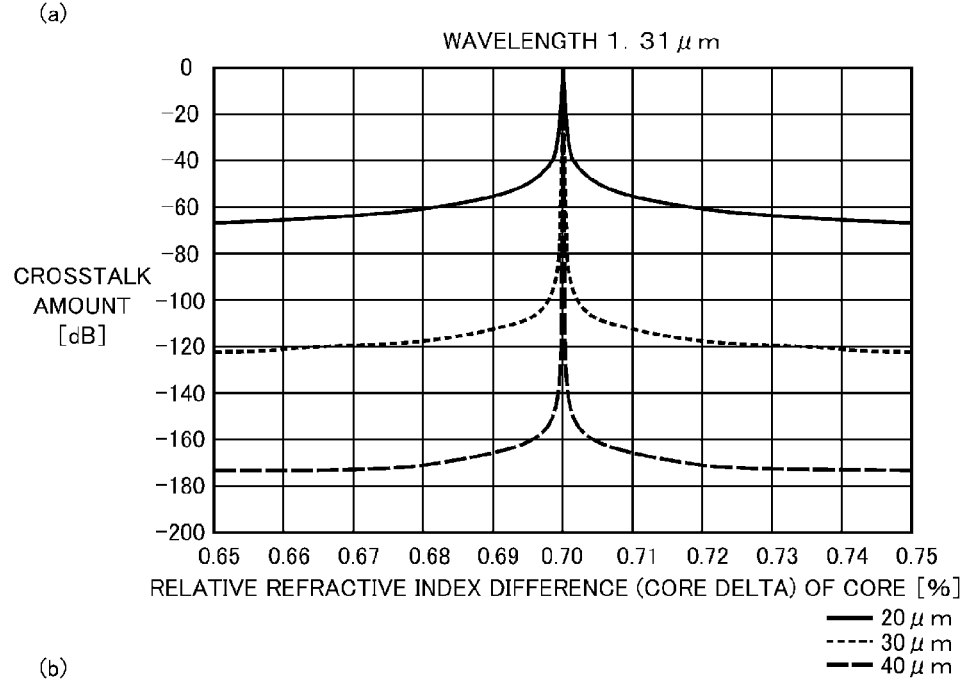
(b)
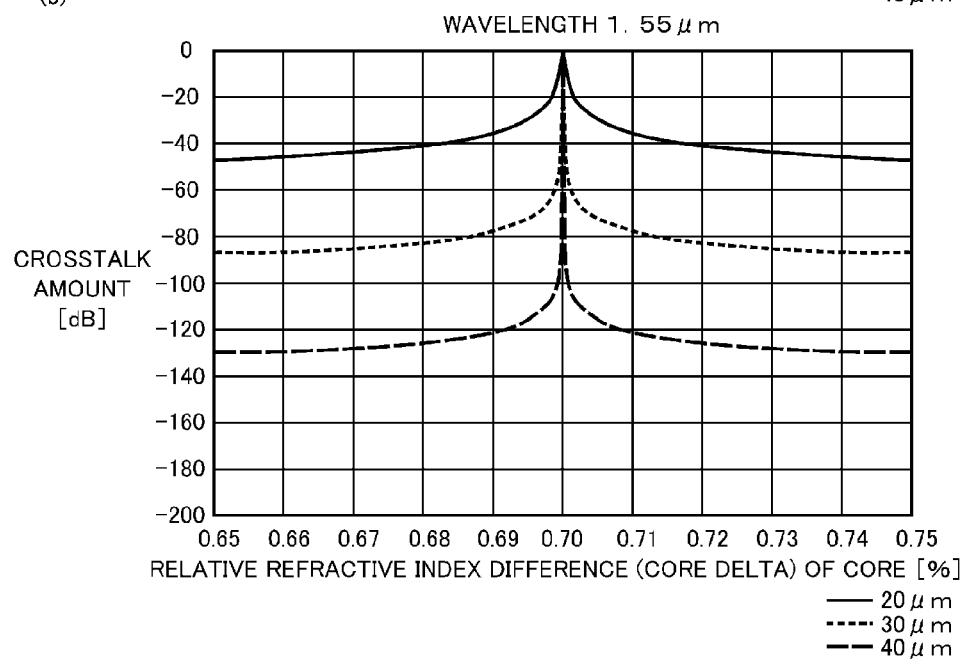

[Fig. 13]
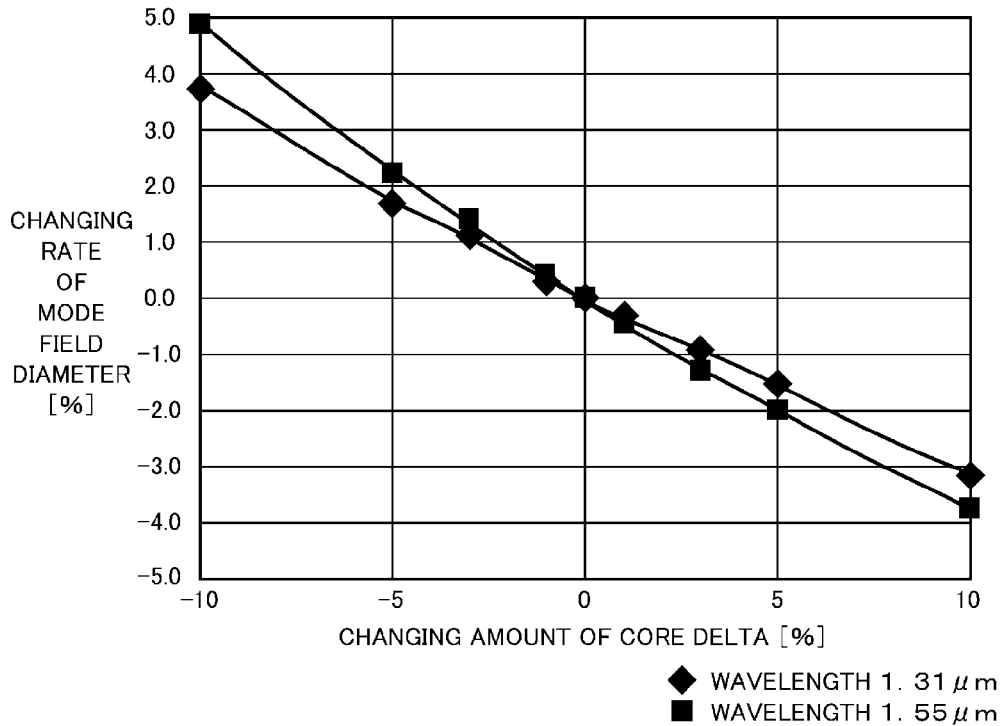
[Fig. 14]
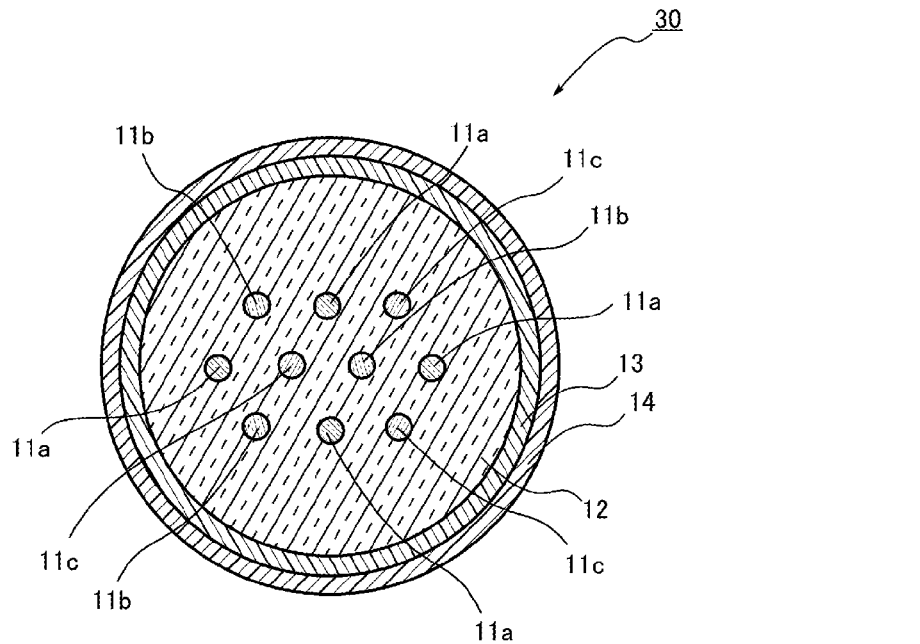

MULTICORE FIBER

CROSS-REFERENCE TO RELATED APPLICATIONS

This application is a Continuation of copending PCT International Application No. PCT/JP2010/064280 filed on Aug. 24, 2010, which designated the United States, and on which priority is claimed under 35 U.S.C. §120. This application also claims priority under 35 U.S.C. §119(a) on Patent Application No. 2009-199094 filed in Japan on Aug. 28, 2009. The entire contents of each of the above documents are hereby incorporated by reference into the present application.

TECHNICAL FIELD

The present invention relates to a multicore fiber.

BACKGROUND ART

Currently, an optical fiber used in a popularized optical fiber transmission system has a configuration in which the outer circumference of a core is covered with a clad, and an optical signal is propagated in the core to cause information to be transmitted. Recently, along with the popularization of the optical fiber transmission system, the amount of information to be transmitted by the optical fiber drastically increases. In response to such an increase in amount of information to be transmitted, as many as tens to hundreds of optical fibers are used in the optical fiber transmission system to perform large-capacity long-distance optical communication.

In order to reduce the number of optical fibers in the optical fiber transmission system, it is known that a multicore fiber, in which the outer circumferences of plural cores are covered with a clad, is used to transmit plural signals by light propagated in the respective cores.

Non-Patent Document 1 shown below describes such a multicore fiber. However, according to Non-Patent Document 1, in an optical fiber in which plural cores are formed in a clad, there is a case in which the cores are optically connected to one another, which results in mutual interference among optical signals propagated in the cores. It is effective ways to restrict such interference of the optical signals are enlarging the distances among the cores to prevent optical connection among the cores, heightening the relative refractive index difference against the clad to concentrate light on the cores, and giving the adjacent cores largely different relative refractive index differences to restrict optical connection among the cores. Further, according to Non-Patent Document 1, in a case of a multicore fiber using plural cores whose relative refractive index difference against the clad is 0.35%, optical interference can be restricted to be small when the center-to-center distance of the cores is 70 μm or larger, and in a case where the adjacent cores have largely different relative refractive index differences, optical interference can be restricted to be small when the center-to-center distance of the cores is 35 μm or larger. Such reduction in center-to-center distance enables 7 cores to be arranged in a normally used 125 μm optical fiber (Non-Patent Document 1).

CITATION LIST

Non-Patent Document

[Non-Patent Document 1] Masanori KOSHIBA "Heterogeneous multi-core fibers: proposal and design principle" IEICE Electronics Express, Vol. 6, No. 2

SUMMARY OF THE INVENTION

Objects to be Achieved by the Invention

However, if the relative refractive index difference is heightened as in the multicore fiber described in Non-Patent Document 1, the mode field diameter may become too small, and a connection loss may be increased in the optical transmission system in which the multicore fibers are connected to one another. On the other hand, in a case where the relative refractive index difference is small, optical interference may occur among the adjacent cores. When the connection loss or the optical interference among the adjacent cores occurs in this manner, the error rate in the optical communication tends to be heightened. Thus, generally in such a case, the communication speed needs to be lowered, and the communication distance needs to be shortened.

It is an object of the present invention to provide a multicore fiber enabling achievement of large-capacity long-distance optical communication.

Means for Achieving the Objects

A multicore fiber according to the present invention comprises 7 or more cores, and a clad covering outer circumferences of the respective cores and formed in a circular shape on a cross-section thereof, wherein diameters of the adjacent cores differ from one another, each of the cores performs single-mode propagation at a transmission wavelength, a relative refractive index difference of each of the cores against the clad is less than 1.4%, a center-to-center distance between the adjacent cores is less than 50 μm, in a case where the transmission wavelength of each of the cores is $\lambda$, the center-to-center distance between the adjacent cores is $\Lambda$, a mode field diameter at the transmission wavelength of each of the cores is MFD, and a theoretical cutoff wavelength of each of the cores is $\lambda c$, $(\Lambda/MFD)\cdot(2\lambda c/(\lambda c+\lambda)) \geq 3.95$ is satisfied, a distance between the outer circumference of the core farthest from a center and an outer circumference of the clad is 2.5 or higher times as long as the mode field diameter of each of the cores.

With such a multicore fiber, since the center-to-center distance between the adjacent cores is less than 50 μm, 7 or more cores can be arranged in a generally used optical fiber having a clad outside diameter of 150 μm or 125 μm, and a large-capacity communication can be performed as 7 or more cores are provided. Further, the diameters of the adjacent cores differ from one another, and in a case where the transmission wavelength of each of the cores is $\lambda$, the center-to-center distance between the adjacent cores is $\Lambda$, the mode field diameter at the transmission wavelength of each of the cores is MFD, and the theoretical cutoff wavelength of each of the cores is $\lambda c$, $(\Lambda/MFD)\cdot(2\lambda c/(\lambda c+\lambda)) \geq 3.95$ is satisfied. Thus, optical connection between the adjacent cores is restricted, and even when the plural cores are arranged, it is possible to restrict mutual interference among signal light propagated in the respective cores. Further, since the relative refractive index difference of each of the cores is less than 1.4%, it is possible to restrict generation of a connection loss when the multicore fibers are to be connected to one another. Still further, since the distance between the outer circumference of the core and the outer circumference of the clad is 2.5 or higher times as long as the mode field diameter of the core, it is possible to prevent signal light propagated in each of the cores from leaking out of the clad. Accordingly, since the error rate in the optical communication can be lowered, a large-capacity long-distance optical communication can be achieved.

Further, in the multicore fiber, a difference between the diameters of the adjacent cores is preferably 0.3% or more and less than 5% of an average of the diameters of the adjacent cores.

With such a multicore fiber, since the difference between the diameters of the adjacent cores is 0.3% or more of the average of the diameters of the adjacent cores, optical connection between the adjacent cores is further restricted. Since the difference between the diameters of the adjacent cores is less than 5% of the average of the diameters of the adjacent cores, the transmission paths can be formed in the respective cores without changing the optical characteristics largely, and optical signals can be propagated in the respective cores under approximately the same conditions. Thus, conditions for optical signals to be input in the cores and facilities do not need to be changed for each core, and processing of the optical signals becomes easy. Further, all the cores can be regarded as approximately equal transmission paths, and thus, in a case where plural multicore fibers are to be connected to one another, a problem such as an increase in connection loss can be prevented from occurring even when respective cores in a multicore fiber that is to connect and respective cores in a multicore fiber that is to be connected are arbitrarily connected.

Further, in the multicore fiber, the difference between the diameters of the adjacent cores is preferably 1% or more and less than 5% of the average of the diameters of the adjacent cores.

Still further, in the multicore fiber, a ratio of the center-to-center distance of the adjacent cores and the mode field diameter at the transmission wavelength of each of the cores is preferably (center-to-center distance)/(mode field diameter) ≧4.3.

With such a multicore fiber, optical connection between the adjacent cores is further restricted, and even when the plural cores are arranged, it is possible to further restrict mutual interference among signal light propagated in the respective cores.

Still further, in the multicore fiber, the relative refractive index difference of each of the cores against the clad is preferably less than 1.1%.

With such a configuration, a connection loss can be further restricted.

Still further, in the multicore fiber, a difference of the relative refractive index differences of the adjacent cores is preferably 1% or more and less than 3% of an average of the relative refractive index differences of the adjacent cores.

With such a multicore fiber, since the relative refractive index differences of the adjacent cores differ from one another, optical connection between the adjacent cores is further restricted, and interference among light propagated in the cores is further restricted. Especially, when the difference of the relative refractive indexes is 1% or more of the average, optical connection between the adjacent cores is further restricted than in a case where the relative refractive index differences of the adjacent cores are equal. Further, when the difference of the relative refractive index differences of the adjacent cores is less than 3% of the average, the transmission paths can be formed in the respective cores without changing the optical characteristics largely, and optical signals can be propagated in the respective cores under approximately the same conditions. Thus, conditions for optical signals to be input in the cores and facilities do not need to be changed for each core, and processing of the optical signals becomes easy. Further, all the cores can be regarded as approximately equal transmission paths, and thus an increase in connection loss can be prevented even when respective cores are arbitrarily connected. Meanwhile, in a case of a multicore fiber having an average of the relative refractive index differences of the adjacent cores of 0.7%, the fact that the difference of the relative refractive index differences of the adjacent cores is 1% or more and less than 3% of the average of the relative refractive index differences of the adjacent cores corresponds to the fact that the relative refractive index differences differ by 0.007% to 0.021%.

Effects of the Invention

As described above, with the present invention, a multicore fiber enabling achievement of a large-capacity long-distance optical communication is provided.

BRIEF DESCRIPTION OF THE DRAWINGS

FIG. 1 is a cross-sectional view illustrating a state in a cross-section perpendicular to a longitudinal direction of a multicore fiber according to a first embodiment of the present invention.

FIG. 2 illustrates the relationship between a relative refractive index difference and a diameter of a core.

FIGS. 3(a) and 3(b) illustrate the relationships between a difference between the diameters of the adjacent cores and interference of signal light (crosstalk amount).

FIGS. 4(a) and 4(b) illustrate the relationships between a ratio of the center-to-center distance of the cores and the mode field diameter and a crosstalk amount per length of 1 km.

FIG. 5 illustrates the relationship between a ratio of the center-to-center distance of the cores and the mode field diameter and a crosstalk amount per length of 1 km.

FIG. 6 illustrates the relationship between a value in which the center-to-center distance of the cores, the mode field diameter, the theoretical cutoff frequency, and the frequency of the optical signal satisfy a predetermined relationship and a crosstalk amount per length of 1 km.

FIG. 7 illustrates a case in which the difference of the core diameters of the pair of adjacent cores in FIG. 6 is changed.

FIGS. 8(a) and 8(b) illustrate the relationships between a relative refractive index difference and a center-to-center distance of the cores.

FIGS. 9(a) and 9(b) illustrate the relationships between a relative refractive index difference and a connection loss of the core.

FIG. 10 illustrates dependence of the mode field diameter on the diameter of the core.

FIG. 11 is a cross-sectional view illustrating a state in a cross-section perpendicular to a longitudinal direction of a multicore fiber according to a second embodiment of the present invention.

FIGS. 12(a) and 12(b) illustrate the relationships between a difference between the relative refractive index differences of the adjacent cores and interference of signal light (crosstalk amount).

FIG. 13 illustrates dependence of the mode field diameter on the core delta.

FIG. 14 illustrates a modification example of the multicore fiber illustrated in FIG. 1.

EMBODIMENTS OF THE INVENTION

Hereinafter, preferred embodiments of a multicore fiber according to the present invention will be described in details with reference to the drawings.

First Embodiment

FIG. 1 is a cross-sectional view illustrating a state in a cross-section perpendicular to a longitudinal direction of a multicore fiber according to an embodiment of the present invention.

As illustrated in FIG. 1, a multicore fiber 10 includes plural cores 11a, 11b, and 11c having different diameters from one another, a clad 12 covering the outer circumferences of the respective cores 11a, 11b, and 11c, an inner protective layer 13 covering the outer circumference of the clad 12, and an outer protective layer 14 covering the outer circumference of the inner protective layer 13. It is to be noted that FIG. 1 shows a case in which the total number of cores is 7.

The plural cores 11a, 11b, and 11c are arranged to have predetermined spaces on the cross-section of the multicore fiber 10. Specifically, one core 11a is arranged at the center of the clad 12, and plural cores 11b and plural cores 11c are arranged alternately in a circumferential direction around the core 11a. Further, the cores 11b and the cores 11c are arranged so that the center-to-center distances between the adjacent cores 11b and 11c may be equal to one another. Further, the cores 11b and the cores 11c are arranged so that the center-to-center distance between the core 11a and each core 11b and the center-to-center distance between the core 11a and each core 11c may be equal to the center-to-center distance between the adjacent cores 11b and 11c. In this manner, the plural cores 11a, 11b, and 11c are arranged centering on the core 11a in a triangular lattice shape with a core 11a, a core 11b, and a core 11c as a set. Accordingly, the core 11a is adjacent to the cores 11b and the cores 11c, each core 11b is adjacent to the cores 11c and the core 11a, and each core 11c is adjacent to the cores 11b and the core 11a. Arranging the cores 11a to 11c in the triangular lattice shape in this manner is preferable from a viewpoint of heightening the filling rate of the cores. It is to be noted that the filling rate of the cores means the number of cores divided by the cross-sectional area of the clad.

Further, the diameter of the core 11a, the diameter of each core 11b, and the diameter of each core 11c are different from one another as described above. Accordingly, the diameters of the adjacent cores are different from one another. Thus, the plural cores are arranged so that the diameters of the adjacent cores may be different from one another due to three kinds of cores having different diameters. The difference between the diameters of the adjacent cores is 0.3% or more and less than 5% of the average of the diameters of the adjacent cores. Moreover, the difference between the diameters of the adjacent cores is more preferably 1% or more and less than 5% of the average of the diameters of the adjacent cores.

Although the size of each component of the multicore fiber is not particularly limited since it is selected appropriately in accordance with the application, for example, the diameters of the cores 11a, 11b, and 11c are 4 µm to 9 µm each, the outside diameter of the clad 12 is 80 µm to 200 µm, the outside diameter of the inner protective layer 13 is 90 µm to 350 µm, and the outside diameter of the outer protective layer 14 is 120 µm to 400 µm. Further, the center-to-center distances of the adjacent cores 11a, 11b, and 11c are 20 µm or more and less than 50 µm each.

Further, in the multicore fiber 10, the respective refractive indexes of the plural cores 11a, 11b, and 11c are higher than the refractive index of the clad 12. The relative refractive index differences (core deltas) of the cores 11a, 11b, and 11c against the clad 12 are equal to one another. This core delta is less than 1.4%.

An example of a material forming the cores 11a, 11b, and 11c is quartz to which dopant heightening the refractive index is added. Examples of the dopant are germanium oxide ($GeO_2$) and aluminum oxide ($Al_2O_3$). Further, examples of a material forming the clad 12 are quartz to which no dopant is added and quartz to which dopant lowering the refractive index such as fluorine (F) is added. Further, an example of a material forming the inner protective layer 13 and the outer protective layer 14 is an ultraviolet curable resin such as acrylate. Meanwhile, a main construction material for the multicore fiber 10 containing the cores 11a to 11c and the clad 12 is generally quartz glass as described above. However, fluorine glass, multicomponent glass such as chalcogenide, or translucent plastic such as PMMA (Polymethylmethacrylate) may be used as a main construction material.

Since the multicore fiber 10 in the present embodiment is used in optical communication, the cores 11a to 11c of the multicore fiber 10 propagate signal light in a single mode. In a case where the cores 11a to 11c can propagate multi-mode light at a transmission wavelength (signal wavelength), signal light is influenced by mode dispersion, and the error rate in the optical communication is heightened. Bringing the signal light into single-mode light can be achieved by adjusting the diameters of the cores and the core deltas so that a theoretical cutoff wavelength may be below the transmission wavelength. Further, the theoretical cutoff wavelength does not have to be designed to be below the transmission wavelength, and for example, the diameters of the cores 11a to 11c and the core deltas may be adjusted so that a cable cutoff wavelength, defined in ITU-T G.650.1, may be below the transmission wavelength with use of a difference in propagation loss between a higher-order mode and a fundamental mode. Further, even in a case where the cable cutoff wavelength is above the transmission wavelength, a cutoff wavelength under actual use conditions in consideration of the line length, cable structure, laying environment, and the like (generally referred to as an effective cutoff wavelength) has only to be below the transmission wavelength. Even in the case where the theoretical cutoff wavelength is not below the transmission wavelength in this manner, the theoretical cutoff wavelength must be 1.19 times or below of the transmission wavelength.

Further, although the transmission wavelength is not particularly limited, it is preferably any of O-band to L-band (1260 nm to 1625 nm), in which a general communication is performed, and is more preferably selected from any or a plurality of O-band ranging from 1260 nm to 1340 nm, C-band ranging from 1535 nm to 1565 nm, and L-band ranging from 1565 nm to 1625 nm. Further, it is more preferable to increase the transmission capacity by multiple-wavelength transmission.

Next, the relationship between the aforementioned core delta and mode field diameter will be described.

FIG. 2 illustrates the relationship between a core delta and a diameter of the core in a case where the theoretical cutoff wavelength is 1.30 µm. As illustrated in FIG. 2, when the core delta is larger, the diameter of the core is smaller. Thus, it can be said that, when the theoretical cutoff wavelength is constant, the mode field diameter is smaller as the core delta is larger at each wavelength.

Next, requirements to be satisfied by each core for arranging 7 or more cores 11a to 11c in the clad 12 having an outside diameter of 125 μm will be described.

First, the relationship between a difference between the diameters of the adjacent cores and interference of signal light (crosstalk) will be described.

FIGS. 3(a) and 3(b) illustrate the relationships between a difference between the diameters of the adjacent cores and interference of signal light at the center-to-center distances of the adjacent cores of 20 μm, 30 μm, and 40 μm and at wavelengths of optical signals propagated in the cores 11a to 11c of the multicore fiber 10 of 1.31 μm and 1.55 μm. In each of FIGS. 3(a) and 3(b), the horizontal axis represents the diameter of the other core in a case where the diameter of one core is 6 μm while the vertical axis represents the crosstalk amount in a case where the diameter of the other core is changed under conditions in which the crosstalk amount in a case where the diameters of the respective cores are equal is 1. The vertical axis is expressed as decibel (dB). Specifically, the vertical axis represents the crosstalk amount of a pair of adjacent cores with use of a calculation result in a case where the core delta is 0.7% with the diameters of the cores around 6 μm.

As illustrated in FIGS. 3(a) and 3(b), the crosstalk amount when the wavelength of an optical signal is 1.55 μm, which is longer, is more than the crosstalk amount when the wavelength of an optical signal is 1.31 μm, which is shorter. As illustrated in FIG. 3(b), in a case where the wavelength of the optical signal is 1.55 μm, when the diameters of the adjacent cores differ by 0.02 μm (0.3%) at the center-to-center distance of the adjacent cores of 20 μm, it is found that the crosstalk amount is decreased by approximately 20 dB. Similarly, when the diameters of the adjacent cores differ by 0.02 μm (0.3%) at the center-to-center distance of the adjacent cores of 30 μm, it is found that the crosstalk amount is decreased by approximately 60 dB. Further, when the diameters of the adjacent cores differ by 0.02 μm (0.3%) at the center-to-center distance of the adjacent cores of 40 μm, it is found that the crosstalk amount is decreased by approximately 100 dB. In this manner, when the diameters of the adjacent cores differ from each other, the crosstalk is drastically decreased. Further, when the difference of the diameters of the cores is 0.06 μm (1.0%), the crosstalk is decreased further by 10 dB or so than in the case where the difference of the diameters of the cores is 0.3%. In such a relationship between the difference of the diameters of the cores and the crosstalk, the difference of the diameters of the adjacent cores is 0.3% or more (0.02 μm or more) in the multicore fiber 10 in the present embodiment as described above, and thus the crosstalk amount is decreased sufficiently.

Meanwhile, the upper limit of the crosstalk acceptable for transmission is generally about −30 dB although it varies depending on the transmission method, transmission equipment, transmission speed, transmission distance, and the like. Accordingly, there is no problem when the crosstalk amount is −30 dB at a transmission distance of 1 km at a wavelength of 1.55 μm, which is a severer condition for transmission characteristics as a transmission distance that should be satisfied at a minimum.

Further, in the multicore fiber 10 in the present embodiment, since the difference between the diameters of the adjacent cores is less than 5% of the average of the diameters of the adjacent cores as described above, optical signals can be propagated in the respective cores under approximately the same conditions. Thus, conditions for optical signals to be input in the cores and facilities do not need to be changed for each core, and processing of the optical signals becomes easy.

Further, all the cores can be regarded as approximately equal transmission paths, and thus, in a case where plural multicore fibers are to be connected to one another, a problem such as an increase in connection loss can be prevented from occurring even when respective cores in a multicore fiber that is to connect and respective cores in a multicore fiber that is to be connected are arbitrarily combined and connected.

Next, the center-to-center distance of the adjacent cores will be described. The center-to-center distance of the cores is preferably as small as possible. Especially, in order to satisfy ability to fill 7 or more cores in a fiber having a clad outside diameter of 150 μm, more preferably 7 or more cores in a fiber having a clad outside diameter of 125 μm, which is a clad outside diameter of a general optical fiber, or cores at higher filling rate of the cores, the center-to-center distance of the cores must be 50 μm or less.

Next, the relationship between a ratio of the center-to-center distance of the cores $\Lambda$ and the mode field diameter MFD (center-to-center distance/mode field diameter: $\Lambda$/MFD) and a crosstalk amount will be described.

FIGS. 4(a) and 4(b) illustrate the relationships between a ratio of the center-to-center distance of the cores and the mode field diameter and a crosstalk amount per length of 1 km. Specifically, FIGS. 4(a) and 4(b) illustrate results of calculation of crosstalk amounts between a pair of adjacent cores to show the relationships. In this case, the difference of the core diameters of the pair of adjacent cores is 1%, and the theoretical cutoff wavelength $\lambda c$ is 1.30 μm. FIG. 4(a) illustrates the $\Lambda$/MFD on the horizontal axis and the crosstalk amount per length of 1 km on the vertical axis when the wavelength of the optical signal is 1.31 μm. FIG. 4(b) illustrates the $\Lambda$/MFD on the horizontal axis and the crosstalk amount per length of 1 km on the vertical axis when the wavelength of the optical signal is 1.55 μm. It is to be noted that "$\Delta$" in FIGS. 4(a) and 4(b) represents a core delta. As illustrated in FIGS. 4(a) and 4(b), when the $\Lambda$/MFD is fixed, the crosstalk amount is fixed approximately unambiguously, regardless of the value of the core delta. Further, in a comparison between FIGS. 4(a) and 4(b), in a case where $\Lambda$/MFD values are equal in FIGS. 4(a) and 4(b), the crosstalk amount at a wavelength of the optical signal of 1.55 μm is larger. Accordingly, under the conditions in which the crosstalk amount is −30 dB or less at a wavelength of the optical signal of 1.55 μm, the crosstalk amount is −30 dB or less at a wavelength of the optical signal of 1.31 μm as well. Thus, in order to satisfy the minimum necessary crosstalk amount (−30 dB at the time of a 1-km transmission), the $\Lambda$/MFD shall be 4.3 or more when the difference of the core diameters of the pair of adjacent cores is 1%, and the theoretical cutoff wavelength $\lambda c$ is 1.30 μm.

FIG. 5 illustrates the relationship between a ratio of the center-to-center distance of the cores and the mode field diameter and a crosstalk amount per length of 1 km in a similar manner to each of FIGS. 4(a) and 4(b). Specifically, FIG. 5 illustrates $\Lambda$/MFD values at wavelengths $\lambda$ of the optical signals of 1.31 μm and 1.55 μm and at theoretical cutoff wavelengths $\lambda c$ of 1.30 μm and 1.50 μm. Meanwhile, in FIG. 5 as well as FIGS. 4(a) and 4(b), calculation is performed under conditions in which the difference of the core diameters of the pair of adjacent cores is 1%. As illustrated in FIG. 5, the $\Lambda$/MFD at a crosstalk amount per 1 km of −30 dB is the smallest in a case where the theoretical cutoff wavelength $\lambda c$ is 1.50 μm, and where the wavelength $\lambda$ of the optical signal is 1.31 μm while the $\Lambda$/MFD at a crosstalk amount per 1 km of −30 dB is the largest in a case where the theoretical cutoff wavelength $\lambda c$ is 1.30 μm, and where the wavelength λ of the optical signal is 1.55 μm. Thus, when the Λ/MFD is 4.3 or more, the crosstalk amount per 1 km is −30 dB or less.

FIG. 6 illustrates the relationship between a value in which the center-to-center distance of the cores, the mode field diameter, the cutoff frequency, and the frequency of the optical signal satisfy a predetermined relationship and a crosstalk amount per length of 1 km under the same conditions as those in FIG. 5. Specifically, FIG. 6 illustrates Equation 1 shown below on the horizontal axis and the crosstalk amount per 1 km on the vertical axis at wavelengths λ of the optical signals of 1.31 μm and 1.55 μm and at theoretical cutoff wavelengths λc of 1.30 μm and 1.50 μm.

$$(\Lambda/\text{MFD})\cdot(2\lambda c/(\lambda c+\lambda)) \quad \text{(Equation 1)}$$

As illustrated in FIG. 6, the relationship between Equation 1 shown above and the crosstalk amount per 1 km is approximately in a linear form regardless of the wavelength λ of the optical signal or the theoretical cutoff wavelength λc. It is found from FIG. 6 that, in order to satisfy the minimum necessary crosstalk amount (−30 dB at the time of a 1-km transmission), Equation 1 shown above has only to be 3.8 or more. When this condition is satisfied, the condition in which the Λ/MFD is 4.3 or more described with reference to FIGS. 4(a) and 4(b) will be satisfied.

FIG. 7 illustrates a case in which the difference of the core diameters of the pair of adjacent cores in FIG. 6 is changed. Specifically, FIG. 7 illustrates Equation 1 shown above on the horizontal axis and the crosstalk amount per 1 km on the vertical axis at wavelengths λ of the optical signals of 1.31 μm and 1.55 μm and at theoretical cutoff wavelengths λc of 1.30 μm and 1.50 μm in a similar manner to FIG. 6 in a case where the difference of the core diameters of the pair of adjacent cores is 0.3%. It is found from FIG. 7 that, in order to satisfy the minimum necessary crosstalk amount (−30 dB at the time of a 1-km transmission) in the case where the difference of the core diameters of the pair of adjacent cores is 0.3%, Equation 1 shown above has only to be 3.95 or more. In general, when an optical fiber is manufactured so that the core diameters of adjacent cores may differ from each other, the core diameters differ from each other by 0.3% or more. Thus, in order for the crosstalk amount per 1 km to be −30 dB or less in the case where the core diameters of adjacent cores differ from each other, Equation 1 shown above has only to be 3.95 or more.

Next, an acceptable value of the crosstalk and a lower limit of the core delta of the core under specific core filling conditions will be described. FIGS. 8(a) and 8(b) illustrate the relationships between a core delta and an inter-core distance. Specifically, FIG. 8(a) illustrates a region to be filled with a core delta at the respective inter-core distances in a case where the crosstalk amount per 1 km is −30 dB or less (in a case where the Λ/MFD is 4.3 or more) at a wavelength of the optical signal propagated in the core of 1.55 μm and at a difference of the diameters of the adjacent cores of 1.0% with respect to the average of the diameters of the adjacent cores, and FIG. 8(b) illustrates a region to be filled with a core delta at the respective inter-core distances in a case where the crosstalk amount per 1 km is −30 dB or less (in a case where the Λ/MFD is 4.3 or more) at a wavelength of the optical signal propagated in the core of 1.55 μm and at a difference of the diameters of the adjacent cores of 0.3% with respect to the average of the diameters of the adjacent cores.

As illustrated in FIG. 8(a) by the shaded region, in order for the crosstalk to be −30 dB or less in the case where the difference of the diameters of the adjacent cores is 1.0% with respect to the average of the diameters of the adjacent cores, the core delta shall be 0.27% or more when the inter-core distance Λ is 50 μm, the core delta shall be 0.45% or more when the inter-core distance Λ is 40 μm, and the core delta shall be 0.75% or more when the inter-core distance Λ is 30 μm. Further, as illustrated in FIG. 8(b) by the shaded region, in order for the crosstalk to be −30 dB or less in the case where the difference of the diameters of the adjacent cores is 0.3% with respect to the average of the diameters of the adjacent cores, the core delta shall be 0.30% or more when the inter-core distance Λ is 50 μm, the core delta shall be 0.46% or more when the inter-core distance Λ is 40 μm, and the core delta shall be 0.81% or more when the inter-core distance Λ is 30 μm. In this manner, it is found that the core delta needs to be larger in order to shorten the inter-core distance.

In this manner, a substantial lower limit of the core delta of the core in a case of fixing the inter-core distance is fixed.

Next, the relationship between a core delta and a connection loss will be described.

FIGS. 9(a) and 9(b) illustrate the relationships between a core delta and a connection loss. That is, FIG. 9(a) illustrates the relationship between a core delta and a connection loss in a case where the wavelength of the optical signals propagated in the cores 11a to 11c of the multicore fiber 10 is 1.31 μm while FIG. 9(b) illustrates the relationship between a core delta and a connection loss in a case where the wavelength of the optical signals propagated in the cores 11a to 11c of the multicore fiber 10 is 1.55 μm.

Specifically, FIGS. 9(a) and 9(b) illustrate connection losses from a state in which the central axis of a multicore fiber that is to connect and the central axis of a multicore fiber that is to be connected correspond to each other completely to a state in which misalignment (offset) of the central axes of the cores is changed in a case where the multicore fibers are to be connected to each other. As illustrated in FIGS. 9(a) and 9(b), when the core delta is larger, the connection loss at the same offset is larger. Further, in a case where the offset amounts are equal to each other, the connection loss is larger at a shorter wavelength. A connection loss acceptable for a general communication is 0.5 dB or less per connection point. Further, as for the multicore fiber, not only the misalignment of the central axes but also offset of the peripheral cores caused by rotational misalignment need to be considered in consideration of performances of a connector or a fusion splicer, and the offset may be larger than that of a conventional fiber. However, a possibility that the offset exceeds 1.5 μm does not need to be considered unless a special defect exists. Accordingly, assuming that the offset is 1.5 μm at a maximum is all that is needed. In consideration of the above conditions, the upper limit of the core delta shall be 1.4% or so from FIG. 9(a). Further, from FIG. 9(a), setting the upper limit of the core delta to 1.1% is more preferable from a viewpoint of restricting the connection loss more.

In an optical fiber to be used in optical communication, when the connection loss exceeds 0.5 dB, the error rate in the communication is heightened, and the transmission speed must be lowered, or the communication distance must be shortened, although the error rate depends on the number of connection points and the transmission method. However, in the multicore fiber 10 in the present embodiment, since the core delta is less than 1.4%, the connection loss is less than 0.5 dB. Accordingly, even in a case where the multicore fibers 10 are connected to one another, optical communication can be performed without lowering the transmission speed or shortening the communication distance.

Next, as an example of changes in optical characteristics of the core along with changes in diameter of the core, dependence of the mode field diameter on the diameter of the core will be described. FIG. 10 illustrates dependence of the mode field diameter on the diameter of the core. FIG. 10 illustrates results at wavelengths of 1.31 μm and 1.55 μm. From FIG. 10, when the changes in diameter of the core are 5% or less, optical signals can be propagated under substantially approximately the same conditions. Thus, within this range, conditions for optical signals to be input in the cores 11a, 11b, and 11c do not need to be changed for each core, and processing of the optical signals becomes easy.

Next, a distance between the outer circumference of the core and the outer circumference of the clad will be described. As described with reference to FIG. 1, in the multicore fiber 10, the outer circumference of the clad 12 is covered with the inner protective layer 13. When a distance h between the outer circumference of the clad 12 and the outer circumference of each of the cores 11a to 11c is short, a field (electric field distribution) of the signal light propagated in each of the cores 11a to 11c extends over the outer circumference of the clad 12, and the light may leak out of the inner protective layer 13. Thus, the distance h between a core farthest from the center and the outer circumference of the clad 12 needs to be long to some extent. Further, similarly, in a case where the outer circumference of the clad 12 and the core 11a, 11b, or 11c farthest from the center is close, the multicore fiber 10 is easily influenced by a lateral pressure applied thereto and micro bending, and a micro bending loss easily occurs. In consideration of the above, the distance h between the outer circumference of the clad and the outer circumference of the core 11a, 11b, or 11c farthest from the center is preferably 2.5 or higher times as long as the mode field diameter of the core 11a, 11b, or 11c at a transmission wavelength.

With the multicore fiber 10 in the present embodiment, a large-capacity communication can be achieved since the multicore fiber 10 has 7 or more cores 11a to 11c. The center-to-center distance of the adjacent cores is less than 50 μm, the ratio of the center-to-center distance of the adjacent cores and the mode field diameter of each core at a transmission wavelength is (center-to-center distance)/(mode field diameter) ≧4.3, and the diameters of the adjacent cores differ from each other. Further, the diameters of the adjacent cores differ from each other, and the transmission wavelength λ of each core, the center-to-center distance of the adjacent cores Λ, the mode field diameter of each core at the transmission wavelength MFD, and the theoretical cutoff wavelength λc of the core satisfy $(\Lambda/MFD) \cdot (2\lambda c/(\lambda c+\lambda)) \geq 3.95$. Thus, optical connection between the adjacent cores is restricted, and even when the plural cores 11a to 11c are arranged, it is possible to restrict mutual interference among signal light propagated in the respective cores 11a to 11c. Further, since the relative refractive index difference (core delta) of each of the cores 11a to 11c is less than 1.4%, it is possible to restrict generation of a connection loss when the multicore fibers are to be connected to one another. Still further, since the distance between the outer circumference of the core 11a, 11b, or 11c and the outer circumference of the clad 12 is 2.5 or higher times as long as the mode field diameter of the core 11a, 11b, or 11c, it is possible to prevent signal light propagated in each of the cores 11a to 11c from leaking out of the clad 12. Accordingly, since the error rate in the optical communication can be lowered, a large-capacity long-distance optical communication can be achieved.

Further, since the difference between the diameters of the adjacent cores is 0.3% or more and less than 5% of the average of the diameters of the adjacent cores, optical connection between the adjacent cores is further restricted. Since the difference between the diameters of the adjacent cores is less than 5% of the average of the diameters of the adjacent cores, the transmission paths can be formed in the respective cores 11a to 11c without changing the optical characteristics largely, and optical signals can be propagated in the respective cores 11a to 11c under approximately the same conditions. Thus, conditions for optical signals to be input in the cores 11a to 11c and facilities do not need to be changed for each core, and processing of the optical signals becomes easy. Further, all the cores 11a to 11c can be regarded as approximately equal transmission paths, and thus, in a case where plural multicore fibers are to be connected to one another, a problem such as an increase in connection loss can be prevented from occurring even when respective cores in a multicore fiber that is to connect and respective cores in a multicore fiber that is to be connected are arbitrarily connected.

Second Embodiment

Next, a second embodiment of the present invention will be described in details with reference to FIG. 11. It is to be noted that similar or identical components to those in the first embodiment are shown with the same reference numerals, and description of the duplicate components is omitted. FIG. 11 is a cross-sectional view illustrating a state in a cross-section perpendicular to a longitudinal direction of a multicore fiber according to the second embodiment of the present invention.

As illustrated in FIG. 11, a multicore fiber 20 in the present embodiment has 19 cores. These cores include three kinds of cores 11a, 11b, and 11c, and the core 11a is arranged at the center on the cross-section of the multicore fiber 20. The respective cores are arranged in a triangular lattice shape with a core 11a, a core 11b, and a core 11c as a set. In this manner, the adjacent cores have different diameters from one another. In the present embodiment as well, arranging the cores 11a to 11c in the triangular lattice shape is preferable as a filling method of the cores since the filling rate of the cores is heightened.

The diameters of the cores 11a, 11b, and 11c and the center-to-center distances of the adjacent cores 11a, 11b, and 11c are similar to those in the first embodiment. In addition, in the present embodiment, the core deltas of the core 11a, core 11b, and core 11c differ from one another. In other words, the multicore fiber 20 is configured so that the adjacent cores may have different core deltas. In order to change the core deltas of the core 11a, core 11b, and core 11c from one another in this manner, the amount of the aforementioned dopant to be added to the quartz has only to be changed for each of the cores 11a, 11b, and 11c.

Next, the relationship between a difference between the core deltas of the adjacent cores and interference of signal light will be described.

FIGS. 12(a) and 12(b) illustrate the relationships between a difference between the core deltas of the adjacent cores and interference of signal light. Specifically, FIG. 12(a) illustrates a crosstalk amount of a pair of adjacent cores in a case where the wavelength of the optical signal is 1.31 μm and illustrates the core delta of the other core on the horizontal axis in a case where the core delta of one core is 0.7%. Similarly, FIG. 12(b) illustrates a crosstalk amount of a pair of adjacent cores in a case where the wavelength of the optical signal is 1.55 μm and illustrates the core delta of the other core on the horizontal axis in a case where the core delta of one core is 0.7%.

As illustrated in FIG. 12(a), in a case where the wavelength of the optical signal is 1.31 μm, when the core deltas of the adjacent cores differ by 0.007% (the core delta of 1% in comparison with 0.7%) at the center-to-center distance of the adjacent cores of 20 μm, the crosstalk amount is approximately −53 dB. Further, when the core deltas of the adjacent cores differ by 0.007% (the core delta of 1% in comparison with 0.7%) at the center-to-center distance of the adjacent cores of 30 μm, the crosstalk amount is approximately −110 dB. Further, when the core deltas of the adjacent cores differ by 0.007% (the core delta of 1% in comparison with 0.7%) at the center-to-center distance of the adjacent cores of 40 μm, the crosstalk amount is approximately −165 dB. Further, when the difference of the core deltas is 0.021% (the core delta of 3% in comparison with 0.7%), the crosstalk is decreased further by 10 dB or so than in the case where the difference of the core deltas is 0.007% (the core delta of 1% in comparison with 0.7%).

Similarly, as illustrated in FIG. 12(b), in a case where the wavelength of the optical signal is 1.55 μm, when the core deltas of the adjacent cores differ by 0.007% (the core delta of 1% in comparison with 0.7%) at the center-to-center distance of the adjacent cores of 20 μm, the crosstalk amount is approximately −35 dB. Further, when the core deltas of the adjacent cores differ by 0.007% (the core delta of 1% in comparison with 0.7%) at the center-to-center distance of the adjacent cores of 30 μm, the crosstalk amount is approximately −75 dB. Further, when the core deltas of the adjacent cores differ by 0.007% (the core delta of 1% in comparison with 0.7%) at the center-to-center distance of the adjacent cores of 40 μm, the crosstalk amount is approximately −120 dB. Further, when the difference of the core deltas is 0.021% (the core delta of 3% in comparison with 0.7%), the crosstalk is decreased further by 10 dB or so than in the case where the difference of the core deltas is 0.007% (the core delta of 1% in comparison with 0.7%).

Thus, in the multicore fiber 20 in the present embodiment, since the core deltas of the adjacent cores differ from one another, the crosstalk amount is decreased further than that in the first embodiment.

With the multicore fiber 20 in the present embodiment, since the relative refractive index differences (core deltas) of the adjacent cores differ from one another, optical connection between the adjacent cores is further restricted, and interference among light propagated in the cores is further restricted.

Next, as an example of changes in optical characteristics of the core along with changes in core delta, dependence of the mode field diameter on the core delta will be described. FIG. 13 illustrates dependence of the mode field diameter on the core delta. FIG. 13 illustrates results of the dependence of the mode field diameter on the core delta at wavelengths of 1.31 μm and 1.55 μm. From FIG. 13, when the changes in diameter of the core are 3% or less, optical signals can be propagated under substantially approximately the same conditions. Thus, within this range, conditions for optical signals to be input in the cores 11a, 11b, and 11c do not need to be changed for each core, and processing of the optical signals becomes easy.

Although the present invention has been described above taking the first and second embodiments as examples, the present invention is not limited to these.

For example, although the core deltas of the cores 11a, 11b, and 11c are equal to one another in the first embodiment, the refractive indexes of the adjacent cores may differ from one another. In this case, optical connection between the adjacent cores is further restricted, and interference among light propagated in the cores is further restricted.

Further, although the first embodiment shows an example in which the number of cores is 7 while the second embodiment shows an example in which the number of cores is 19, the number of cores may be another number in the present invention. FIG. 14 illustrates a modification example of the multicore fiber shown in FIG. 1, which has a different number of cores. It is to be noted that similar or identical components to those in the first embodiment are shown with the same reference numerals, and description of the duplicate components is omitted. As illustrated in FIG. 14, a multicore fiber 30 in the present modification example has 10 cores. As for these cores, 4 cores are arrayed linearly, and 3-core pairs are arrayed to sandwich the 4 cores. These cores include three kinds of cores 11a, 11b, and 11c, and the respective cores are arranged in a triangular lattice shape with a core 11a, a core 11b, and a core 11c as a set. In this manner, the adjacent cores have different diameters from one another. In the present modification example as well, arranging the cores 11a to 11c in the triangular lattice shape is preferable as a filling method of the cores since the filling rate of the cores is heightened. The diameters of the cores 11a, 11b, and 11c and the center-to-center distances of the adjacent cores 11a, 11b, and 11c are similar to those in the first embodiment. Further, in the present modification example, the core deltas of the core 11a, core 11b, and core 11c differ from one another. In other words, the multicore fiber 30 is configured so that the adjacent cores may have different core deltas. In order to change the core deltas of the core 11a, core 11b, and core 11c from one another in this manner, the amount of the aforementioned dopant to be added to the quartz has only to be changed for each of the cores 11a, 11b, and 11c.

Further, in the aforementioned first embodiment, second embodiment, and modification example, although, as for the respective cores, three kinds of cores 11a to 11c having different diameters are used, all of the cores may have different diameters.

EXAMPLES

Hereinafter, the present invention will be described more specifically by raising examples and comparative examples, but the present invention is not limited to these.

Example 1

In a similar manner to the first embodiment, a multicore fiber having a length of 2.5 km was produced. In the multicore fiber, the diameter of the clad was 142 μm, a core having a diameter of 6.0 μm was arranged at the center while 6 cores that were different from the core arranged at the center only in terms of the diameters were arranged around the core arranged at the center. The center-to-center distance Λ between the cores was 40 μm each, the shortest distance between the outer circumference of the core arranged around the center core and the outer circumference of the clad was 28 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, quartz containing 6.8 mol % of germanium oxide ($GeO_2$) was used for each core, and quartz containing no dopant was used for the clad. The core delta was 0.7%.

The mode field diameter MFD of this multicore fiber at a wavelength λ of 1.31 μm was 6.6 μm, and the mode field diameter MFD at a wavelength λ of 1.55 μm was 7.4 μm. These values of the cores fell within a tolerance of 1% and were approximately equal values. Accordingly, this multicore fiber satisfied (center-to-center distance)/(mode field diameter)≧4.3 at a wavelength λ of 1.31 μm and at a wavelength λ of 1.55 μm. Further, this multicore fiber satisfied (distance between a core farthest from the center and the outer circumference of the clad)/(mode field diameter)≧2.5 in signal light having wavelengths of 1.31 μm and 1.55 μm.

Further, the effective cross-sectional area (Aeff) of this multicore fiber at a wavelength λ of 1.31 μm was 34.5 μm², and the effective cross-sectional area (Aeff) of this multicore fiber at a wavelength λ of 1.55 μm was 42.5 μm². When the cable cutoff wavelength and the zero dispersion wavelength were measured, they were 1.27 μl and 1351 nm, respectively. The theoretical cutoff wavelength λc was 1.287 μm. Thus, the values of Equation 1 shown above were 3.95 or more at wavelengths λ of 1.31 μl and 1.55 μm. When the propagation losses were measured, they were 0.54 dB/km and 0.36 dB/km at wavelengths λ of 1.31 μl and 1.55 μl, respectively. When these values of the losses were derived for the center core and the 6 cores around it, approximately equal values were derived.

Further, signal light was emitted at the center on the incident side of the multicore fiber having a length of 2492 m (2.492 km), the intensities of the signal light output from the cores at the center and at the outer side were measured, and the crosstalk amount was measured from a ratio of the intensity at the center and the intensity at the outer side. As a result, the crosstalk amounts per 1 km were −65 dB and −56 dB at wavelengths of 1.31 μl and 1.55 μl, respectively, which were sufficiently small crosstalk amounts.

Example 2

In a similar manner to EXAMPLE 1, a multicore fiber having a length of 2.0 km was produced. In the multicore fiber, the diameter of the clad was 125 μm, a core having a diameter of 5.25 μm was arranged at the center while 6 cores that were different from the core arranged at the center only in terms of the diameters were arranged around the core arranged at the center. The center-to-center distance Λbetween the cores was 35.2 μm each, the shortest distance between the outer circumference of the core arranged around the center core and the outer circumference of the clad was 24.7 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, materials for the respective cores and the clad were similar to those in EXAMPLE 1. Thus, the core delta was similar to that in EXAMPLE 1.

The mode field diameter MFD of this multicore fiber at a wavelength λ of 1.31 μm was 6.3 μm, and the mode field diameter MFD at a wavelength λ of 1.55 μm was 7.3 μm. These values of the cores fell within a tolerance of 1% and were approximately equal values. Accordingly, this multicore fiber satisfied (center-to-center distance)/(mode field diameter)≧4.3 at a wavelength λ of 1.31 μm and at a wavelength λ of 1.55 μm. Further, this multicore fiber satisfied (distance between a core farthest from the center and the outer circumference of the clad)/(mode field diameter)≧2.5 in signal light having wavelengths of 1.31 μm and 1.55 μm.

Further, the effective cross-sectional area (Aeff) of this multicore fiber at a wavelength λ of 1.31 μm was 31.1 μm², and the effective cross-sectional area (Aeff) of this multicore fiber at a wavelength λ of 1.55 μm was 40.1 μm². When the cable cutoff wavelength and the zero dispersion wavelength were measured, they were 1.12 μm and 1409 nm, respectively. The theoretical cutoff wavelength λc was 1.125 μm. Thus, the values of Equation 1 shown above were 3.95 or more at wavelengths λ of 1.31 μm and 1.55 μm. When the propagation losses were measured, they were 0.65 dB/km and 0.44 dB/km at wavelengths λ of 1.31 μm and 1.55 μm, respectively. When these values of the losses were derived for the center core and the 6 cores around it, approximately equal values were derived.

Further, signal light was emitted at the center on the incident side of the multicore fiber having a length of 1970 m (1.97 km), the intensities of the signal light output from the cores at the center and at the outer side were measured, and the crosstalk amount was measured from a ratio of the intensity at the center and the intensity at the outer side. As a result, the crosstalk amounts per 1 km were −62 dB and −38 dB at wavelengths of 1.31 μm and 1.55 μm, respectively, which were sufficiently small crosstalk amounts.

Example 3

In a similar manner to EXAMPLE 1, a multicore fiber having a length of 2.0 km was produced. In the multicore fiber, the diameter of the clad was 125.8 μm, a core having a diameter of 5.25 μm was arranged at the center while 6 cores that were different from the core arranged at the center only in terms of the diameters were arranged around the core arranged at the center. The center-to-center distance Λbetween the cores was 42 μm each, the shortest distance between the outer circumference of the core arranged around the center core and the outer circumference of the clad was 18.25 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, materials for the respective cores and the clad were similar to those in EXAMPLE 1. Thus, the core delta was similar to that in EXAMPLE 1.

The mode field diameter MFD of this multicore fiber at a wavelength λ of 1.31 μm was 6.3 μm, and the mode field diameter MFD at a wavelength λ of 1.55 μm was 7.3 μm. These values of the cores fell within a tolerance of 1% and were approximately equal values. Accordingly, this multicore fiber satisfied (center-to-center distance)/(mode field diameter)≧4.3 at a wavelength λ of 1.31 μm and at a wavelength λ of 1.55 μm. Further, (distance between a core farthest from the center and the outer circumference of the clad)/(mode field diameter)=2.5 in signal light having a wavelength λ of 1.55 μm.

Further, the effective cross-sectional area (Aeff) of this multicore fiber at a wavelength λ of 1.31 μm was 31.1 μm², and the effective cross-sectional area (Aeff) of this multicore fiber at a wavelength λ of 1.55 μm was 40.1 μm². When the cable cutoff wavelength and the zero dispersion wavelength were measured, they were 1.12 μm and 1409 nm, respectively. The theoretical cutoff wavelength λc was 1.125 μm. Thus, the values of Equation 1 shown above were 3.95 or more at wavelengths λ of 1.31 μm and 1.55 μm. When the propagation losses were measured, they were 0.65 dB/km and 0.44 dB/km at wavelengths λ of 1.31 μm and 1.55 μm, respectively. When these values of the losses were derived for the center core and the 6 cores around it, approximately equal values were derived.

Further, signal light was emitted at the center on the incident side of the multicore fiber having a length of 1970 m (1.97 km), the intensities of the signal light output from the cores at the center and at the outer side were measured, and the crosstalk amount was measured from a ratio of the intensity at the center and the intensity at the outer side. As a result, the crosstalk amounts per 1 km were −64 dB and −53 dB at wavelengths of 1.31 μm and 1.55 μm, respectively, which were sufficiently small crosstalk amounts.

Example 4

In a similar manner to EXAMPLE 1, a multicore fiber having a length of 1.2 km was produced. In the multicore fiber, the diameter of the clad was 145 μm, a core having a diameter of 8.3 μm was arranged at the center while 6 cores that were different from the core arranged at the center only in terms of the diameters were arranged around the core arranged at the center. The center-to-center distance $\Lambda$ between the cores was 41.6 μm each, the shortest distance between the outer circumference of the core arranged around the center core and the outer circumference of the clad was 27.35 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, quartz containing 3.9 mol % of germanium oxide ($GeO_2$) was used for each core, and quartz containing no dopant was used for the clad. The core delta was 0.4%.

The mode field diameter MFD of this multicore fiber at a wavelength $\lambda$ of 1.31 μm was 8.61 μm, and the mode field diameter MFD at a wavelength $\lambda$ of 1.55 μm was 9.66 μm. These values of the 7 cores fell within a tolerance of 1% and were approximately equal values. Accordingly, this multicore fiber satisfied (center-to-center distance)/(mode field diameter)$\geq$4.3 at a wavelength $\lambda$ of 1.31 μm and at a wavelength $\lambda$ of 1.55 μm. Further, this multicore fiber satisfied (distance between a core farthest from the center and the outer circumference of the clad)/(mode field diameter)$\geq$2.5 in signal light having wavelengths of 1.31 μm and 1.55 μm.

Further, the effective cross-sectional area (Aeff) of this multicore fiber at a wavelength $\lambda$ of 1.31 μm was 59.4 μm$^2$, and the effective cross-sectional area (Aeff) of this multicore fiber at a wavelength $\lambda$ of 1.55 μm was 72.4 μm$^2$. When the cable cutoff wavelength and the zero dispersion wavelength were measured, they were 1.28 μm and 1314 nm, respectively. The theoretical cutoff wavelength $\lambda c$ was 1.401 μm. Thus, the values of Equation 1 shown above were 3.95 or more at wavelengths $\lambda$ of 1.31 μm and 1.55 μm. When the propagation losses were measured, they were 0.77 dB/km and 0.82 dB/km at wavelengths $\lambda$ of 1.31 μm and 1.55 μm, respectively. When these values of the losses were derived for the center core and the 6 cores around it, approximately equal values were derived.

Further, signal light was emitted at the center on the incident side of the multicore fiber having a length of 1200 m (1.2 km), the intensities of the signal light output from the cores at the center and at the outer side were measured, and the crosstalk amount was measured from a ratio of the intensity at the center and the intensity at the outer side. As a result, the crosstalk amounts per 1 km were −72 dB and −39 dB at wavelengths of 1.31 μm and 1.55 μm, respectively, which were sufficiently small crosstalk amounts.

Comparative Example 1

A multicore fiber was produced in a similar manner to EXAMPLE 3 except that the center-to-center distance $\Lambda$ between the cores was 47 μm each, and that the shortest distance between the outer circumference of the core arranged around the center core and the outer circumference of the clad was 12.9 μm.

The mode field diameter MFD of this multicore fiber at a wavelength $\lambda$ of 1.31 μm and the mode field diameter MFD at a wavelength $\lambda$ of 1.55 μm were similar to those in EXAMPLE 3, and this multicore fiber satisfied (center-to-center distance)/(mode field diameter)$\geq$4.3 at a wavelength $\lambda$ of 1.31 μm and at a wavelength $\lambda$ of 1.55 μm. Further, at a wavelength of signal light of 1.55 μm, (distance between a core farthest from the center and the outer circumference of the clad 12)/(mode field diameter)=1.77, which was smaller than 2.5.

Further, the effective cross-sectional area (Aeff) of this multicore fiber at a wavelength $\lambda$ of 1.31 μm was 31.1 μm$^2$, and the effective cross-sectional area (Aeff) of this multicore fiber at a wavelength $\lambda$ of 1.55 μm was 40.1 μm$^2$. When the cable cutoff wavelength and the zero dispersion wavelength were measured, they were 1.12 μm and 1409 nm, respectively. The theoretical cutoff wavelength $\lambda c$ was 1.125 μm. Thus, the values of Equation 1 shown above were 3.95 or more at wavelengths $\lambda$ of 1.31 μm and 1.55 μm.

When the propagation losses of the signal light were measured, the propagation losses in the center core were 0.65 dB/km and 0.44 dB/km at wavelengths $\lambda$ of 1.31 μm and 1.55 μm, respectively. The propagation losses of the signal light in each of the 6 cores around it were 0.69 dB/km and 1.2 dB/km at wavelengths $\lambda$ of 1.31 μm and 1.55 μm, respectively. It was found from this result that the propagation loss in the outer core was higher than that in the center core. This may be because the distance between a core farthest from the center and the outer circumference of the clad 12 is small against the mode field diameter.

Comparative Example 2

In a similar manner to EXAMPLE 1, a multicore fiber having a length of 5.0 km was produced. In the multicore fiber, the diameter of the clad was 138 μm, a core having a diameter of 7.9 μm was arranged at the center while 6 cores that were different from the core arranged at the center only in terms of the diameters were arranged around the core arranged at the center. The center-to-center distance $\Lambda$ between the cores was 39 μm each, the shortest distance between the outer circumference of the core arranged around the center core and the outer circumference of the clad was 26.05 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, quartz containing 3.9 mol % of germanium oxide ($GeO_2$) was used for each core, and quartz containing no dopant was used for the clad. The core delta was 0.4%.

The mode field diameter MFD of this multicore fiber at a wavelength $\lambda$ of 1.31 μm was 8.58 μm, and the mode field diameter MFD at a wavelength $\lambda$ of 1.55 μm was 9.64 μm. These values of the 7 cores fell within a tolerance of 1% and were approximately equal values. Accordingly, in this multicore fiber, solutions of (center-to-center distance)/(mode field diameter) at wavelengths $\lambda$ of 1.31 μm and 1.55 μm were 4.5 and 4.05. While it was 4.3 or more at a wavelength $\lambda$ of 1.31 μm, it was less than 4.3 at a wavelength $\lambda$ of 1.55 μm. Further, this multicore fiber satisfied (distance between a core farthest from the center and the outer circumference of the clad)/(mode field diameter)$\geq$2.5 in signal light having wavelengths of 1.31 μm and 1.55 μm.

Further, the effective cross-sectional area (Aeff) of this multicore fiber at a wavelength $\lambda$ of 1.31 μm was 58.6 μm$^2$, and the effective cross-sectional area (Aeff) of this multicore fiber at a wavelength λ of 1.55 μm was 71.6 μm². When the cable cutoff wavelength and the zero dispersion wavelength were measured, they were 1.26 μm and 1316 nm, respectively. The theoretical cutoff wavelength λc was 1.331 μm. Thus, the value of Equation 1 shown above was 3.74, which was a smaller value than 3.95. When the propagation losses were measured, they were 0.76 dB/km and 0.80 dB/km at wavelengths λ of 1.31 μm and 1.55 μm, respectively. When these values of the losses were derived for the center core and the 6 cores around it, approximately equal values were derived.

Further, signal light was emitted at the center on the incident side of the multicore fiber having a length of 5000 m (5.0 km), the intensities of the signal light output from the cores at the center and at the outer side were measured, and the crosstalk amount was measured from a ratio of the intensity at the center and the intensity at the outer side. As a result, the crosstalk amounts per 1 km were −59 dB and −27 dB at wavelengths of 1.31 μm and 1.55 μm, respectively. It was found that, while it was a sufficiently small crosstalk amount at a wavelength λ of 1.31 μm, it was larger than −30 dB at a wavelength λ of 1.55 μm, which was a large crosstalk amount. This may be because, at a wavelength λ of 1.55 μm, (center-to-center distance)/(mode field diameter) is smaller than 4.3, and the value of Equation 1 shown above is smaller than 3.95.

Comparative Example 3

In a similar manner to EXAMPLE 1, a multicore fiber having a length of 3.0 km was produced. In the multicore fiber, the diameter of the clad was 125 μm, a core having a diameter of 7.2 μm was arranged at the center while 6 cores that were different from the core arranged at the center only in terms of the diameters were arranged around the core arranged at the center. The center-to-center distance $\Lambda$ between the cores was 35.2 μm each, the shortest distance between the outer circumference of the core arranged around the center core and the outer circumference of the clad was 23.9 μm, and the respective cores were arranged in a triangular lattice shape. When the diameter of each core was confirmed in a state of a base material before it was filled in the fiber, the diameters of the adjacent cores differed from the average of the diameters of the two cores by 0.3% or more and less than 5%. Further, quartz containing 3.9 mol % of germanium oxide ($GeO_2$) was used for each core, and quartz containing no dopant was used for the clad. The core delta was 0.4%.

The mode field diameter MFD of this multicore fiber at a wavelength λ of 1.31 μm was 8.18 μm, and the mode field diameter MFD at a wavelength λ of 1.55 μm was 9.36 μm. These values of the 7 cores fell within a tolerance of 1% and were approximately equal values. Accordingly, in this multicore fiber, solutions of (center-to-center distance)/(mode field diameter) at wavelengths λ of 1.31 μm and 1.55 μm were 4.30 and 3.76. While it was 4.3 or more at a wavelength λ of 1.31 μm, it was less than 4.3 at a wavelength λ of 1.55 μm. Further, this multicore fiber satisfied (distance between a core farthest from the center and the outer circumference of the clad)/(mode field diameter)≧2.5 in signal light having wavelengths of 1.31 μm and 1.55 μm.

Further, the effective cross-sectional area (Aeff) of this multicore fiber at a wavelength λ of 1.31 μm was 52.3 μm², and the effective cross-sectional area (Aeff) of this multicore fiber at a wavelength λ of 1.55 μm was 66.3 μm². When the cable cutoff wavelength and the zero dispersion wavelength were measured, they were 1.13 μm and 1338 nm, respectively. The theoretical cutoff wavelength λc was 1.204 μm. Thus, the value of Equation 1 shown above was 3.29, which was a smaller value than 3.95. When the propagation losses were measured, they were 0.85 dB/km and 0.95 dB/km at wavelengths λ of 1.31 μm and 1.55 μm, respectively. When these values of the losses were derived for the center core and the 6 cores around it, approximately equal values were derived.

Further, signal light was emitted at the center on the incident side of the multicore fiber having a length of 3000 m (3.0 km), the intensities of the signal light output from the cores at the center and at the outer side were measured, and the crosstalk amount was measured from a ratio of the intensity at the center and the intensity at the outer side. As a result, the crosstalk amounts per 1 km were −39 dB and −12.5 dB at wavelengths of 1.31 μm and 1.55 μm, respectively. It was found that, while it was a sufficiently small crosstalk amount at a wavelength λ of 1.31 μm, it was larger than −30 dB at a wavelength λ of 1.55 μm, which was a large crosstalk amount. This may be because, at a wavelength λ of 1.55 μm, (center-to-center distance)/(mode field diameter) is smaller than 4.3, and the value of Equation 1 shown above is smaller than 3.95.

It is thought from the foregoing description that, the multicore fiber according to the present invention can achieve a large-capacity long-distance optical communication as it has small crosstalk.

INDUSTRIAL APPLICABILITY

With the present invention, a multicore fiber that can achieve a large-capacity long-distance optical communication is provided.

DESCRIPTION OF REFERENCE NUMERALS 10, 20, 30 . . . Multicore fiber
11a, 11b, 11c . . . Core
12 . . . Clad
13 . . . Inner protective layer
14 . . . Outer protective layer

The invention claimed is:
1. A multicore fiber comprising:
7 or more cores; and
a clad covering outer circumferences of the respective cores and formed in a circular shape on a cross-section thereof, wherein
diameters of the adjacent cores differ from one another,
each of the cores performs single-mode propagation at a transmission wavelength,
a relative refractive index difference of each of the cores against the clad is less than 1.4%,
a center-to-center distance between the adjacent cores is less than 50 μm,
in a case where the transmission wavelength of each of the cores is λ, the center-to-center distance between the adjacent cores is $\Lambda$, a mode field diameter at the transmission wavelength of each of the cores is MFD, and a theoretical cutoff wavelength of each of the cores is λc, $(\Lambda/MFD)\cdot(2\lambda c/(\lambda c+\lambda))\geq 3.95$ is satisfied, and
a distance between the outer circumference of the core farthest from a center and an outer circumference of the clad is 2.5 or higher times as long as the mode field diameter of each of the cores.
2. The multicore fiber according to claim 1, wherein a difference between the diameters of the adjacent cores is 0.3% or more and less than 5% of an average of the diameters of the adjacent cores.

3. The multicore fiber according to claim 2, wherein the difference between the diameters of the adjacent cores is 1% or more and less than 5% of the average of the diameters of the adjacent cores.

4. The multicore fiber according to claim 3, wherein a ratio of the center-to-center distance of the adjacent cores and the mode field diameter at the transmission wavelength of each of the cores is (center-to-center distance)/(mode field diameter) $\geq 4.3$.

5. The multicore fiber according to any one of claims 1 to 4, wherein the relative refractive index difference of each of the cores against the clad is less than 1.1%.

6. The multicore fiber according to any one of claims 1 to 4, wherein a difference of the relative refractive index differences of the adjacent cores is 1% or more and less than 3% of an average of the relative refractive index differences of the adjacent cores.

* * * * *